United States Patent [19]

Hoag et al.

[11] Patent Number: 5,609,331
[45] Date of Patent: Mar. 11, 1997

[54] TORSION SPRING ADJUSTMENT APPARATUS

[75] Inventors: Scott T. Hoag, Plymouth; Arnold R. Cooper, Trenton, both of Mich.

[73] Assignee: Ford Motor Company, Dearborn, Mich.

[21] Appl. No.: 523,668

[22] Filed: Sep. 5, 1995

[51] Int. Cl.⁶ .................................................. B60G 11/18
[52] U.S. Cl. ........................................ 267/154; 267/278
[58] Field of Search .................................... 267/154, 273, 267/276, 277, 278; 280/721, 700, 661, 664

[56] References Cited

U.S. PATENT DOCUMENTS

| | | | |
|---|---|---|---|
| 2,561,548 | 7/1951 | Wharam et al. | 267/278 |
| 2,596,922 | 5/1952 | Thoms . | |
| 2,606,758 | 8/1952 | Collier | 267/278 |
| 2,624,568 | 1/1953 | Kany . | |
| 2,715,022 | 8/1955 | Krotz | 267/278 |
| 2,852,269 | 9/1958 | Gaihes | 280/721 |
| 2,855,212 | 10/1958 | Houser | 280/721 |
| 3,104,096 | 9/1963 | Eirhart, Jr. | 280/721 |
| 3,178,200 | 4/1965 | Backaitis et al. . | |
| 3,432,158 | 3/1969 | Goodwih | 267/278 |
| 4,033,605 | 7/1977 | Smith et al. | 267/278 |
| 4,243,247 | 1/1981 | Kataoka | 280/700 |
| 4,274,858 | 6/1981 | Claasen et al. . | |
| 4,415,178 | 11/1983 | Hatsushi et al. | 280/721 |
| 4,488,736 | 12/1984 | Aubry et al. . | |
| 4,635,958 | 1/1987 | Yonemoto . | |
| 4,744,539 | 5/1988 | Stimeling . | |
| 4,854,766 | 8/1989 | Hein . | |
| 5,112,031 | 5/1992 | Hynds et al. | 267/276 |
| 5,297,874 | 3/1994 | Raines . | |
| 5,439,203 | 8/1995 | Hadano . | |

FOREIGN PATENT DOCUMENTS

| | | | |
|---|---|---|---|
| 2504069 | 10/1982 | France | 280/700 |
| 732206 | 2/1943 | Germany | 280/700 |
| 1965464 | 7/1970 | Germany | 267/276 |
| 129626 | 1/1947 | Sweden . | |

*Primary Examiner*—Douglas C. Butler
*Attorney, Agent, or Firm*—Gregory P. Brown

[57] ABSTRACT

A suspension adjuster apparatus (48) suitable for use in a motor vehicle having a torsion spring (30) interposed and connecting a chassis (10) to a chassis member (14) is described. The suspension adjuster (48) includes an adjuster seat (66) and an elastomeric pad (68) disposed between the adjuster seat (66) and the chassis member (14). The adjuster apparatus (48) preloads the torsion spring (30) to provide a predetermined ride height while reducing the vibrations transmitted from the suspension to the chassis and passenger compartment of the motor vehicle.

15 Claims, 3 Drawing Sheets

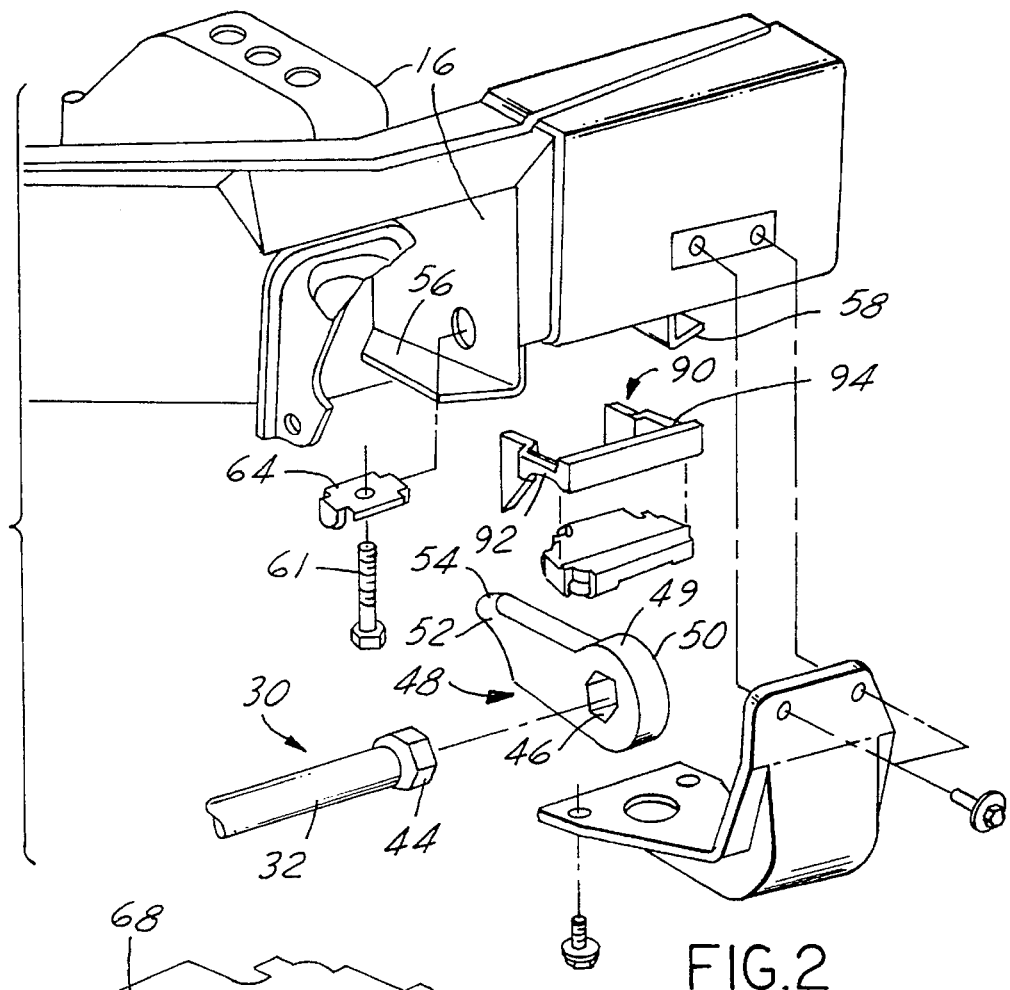
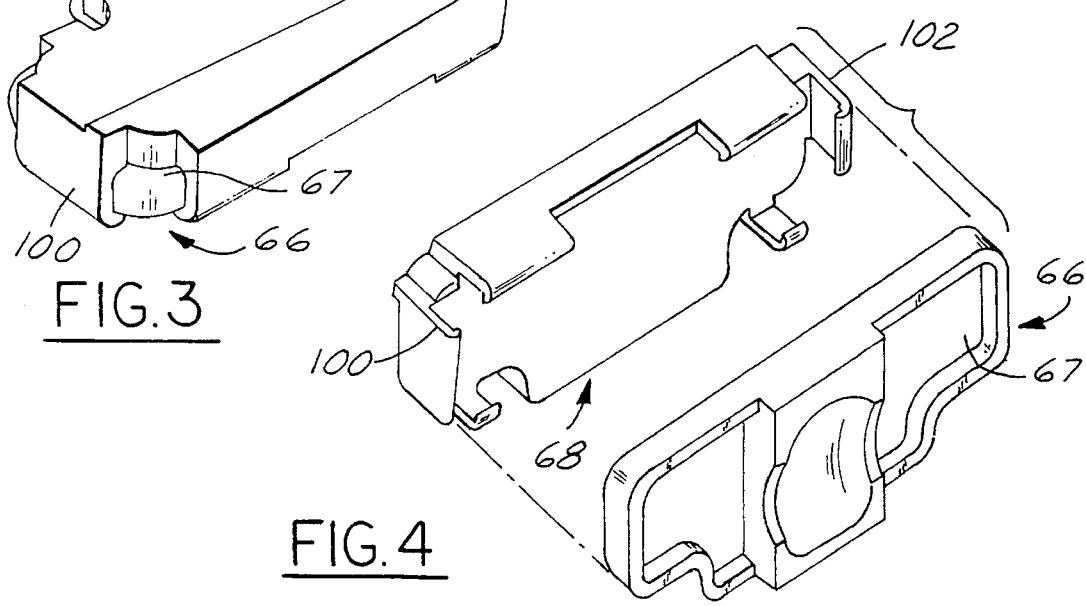

TORSION SPRING ADJUSTMENT APPARATUS

BACKGROUND OF THE INVENTION

1. Field of the Invention

This invention relates generally to a torsion spring suspension for use on a motor vehicle. More particularly, the present invention relates to a torsion spring adjustment apparatus for retaining a torsion spring in a predetermined orientation and preload.

2. Disclosure Information

Torsion spring suspensions are well known in the motor vehicle industry. The design is desirable for its ability to provide simplified, low cost ride height adjustments to compensate for vehicle build tolerances and weight variations of vehicles having different customer preferred options.

One problem associated with torsion spring suspensions relates to dynamic reaction loads imposed on the vehicle structure at the spring adjuster seat. To minimize the stresses throughout the suspension components when subjected to these dynamic reaction loads the torsion spring should not be rigidly attached to the chassis. One solution is to provide a floating adjuster for securing the torsion spring to the vehicle structure. Thus, a floating torsion spring adjuster must maintain a predetermined angular orientation, which in turn maintains a predetermined preload in the torsion spring, while allowing the torsion spring to undergo very small lateral and longitudinal displacement in response to various suspension movements, including recession, jounce and rebound. While this effectively reduces stresses within the suspension components, the looseness of the adjuster may result in the generation of objectionable operational noises. One of these objectionable noises is best described as a clunk. Conventional elastomeric isolators have been unsatisfactory as they typically do not last long when subjected to the dynamic reaction loads imposed by the torsion spring.

It would be desirable to provide a torsion spring adjuster that minimizes the stresses in the suspension components by using a floating adjuster at the vehicle structure while preventing the generation of objectionable noises, such as clunk.

SUMMARY OF THE INVENTION

According to the present invention, a torsion spring adjuster is disclosed for use in a motor vehicle having a torsion spring suspension. The torsion spring adjuster includes an adjuster having a non-circular aperture for receiving one end of a torsion bar therein and a first contact face disposed on an outer surface. The torsion spring adjuster also includes an adjuster seat having a first surface and a second surface, the first surface having a second contact face disposed thereon to matingly receive the first contact face of the adjuster. An elastomeric pad is disposed between the second surface of the adjuster seat and a chassis member to reduce noise generated by operation of the torsion spring suspension.

An advantage of this torsion spring adjuster apparatus is to provide an inexpensive and serviceable torsion spring suspension in which the rearward end of the spring is angularly adjustably mounted upon the structural support member to permit adjustment of the riding height of the vehicle without imparting vibration or noise into the motor vehicle during operation of the vehicle suspension.

BRIEF DESCRIPTION OF THE DRAWING

FIG. 2 is an exploded perspective view of the torsion spring adjuster apparatus according to the present invention.

FIG. 3 is a perspective view of an adjuster seat and an elastomeric pad assembled in accordance with the present invention.

FIG. 4 is an exploded perspective view of the adjuster seat and elastomeric pad according to the present invention.

DETAILED DESCRIPTION OF THE PREFERRED EMBODIMENT

Figure 1:
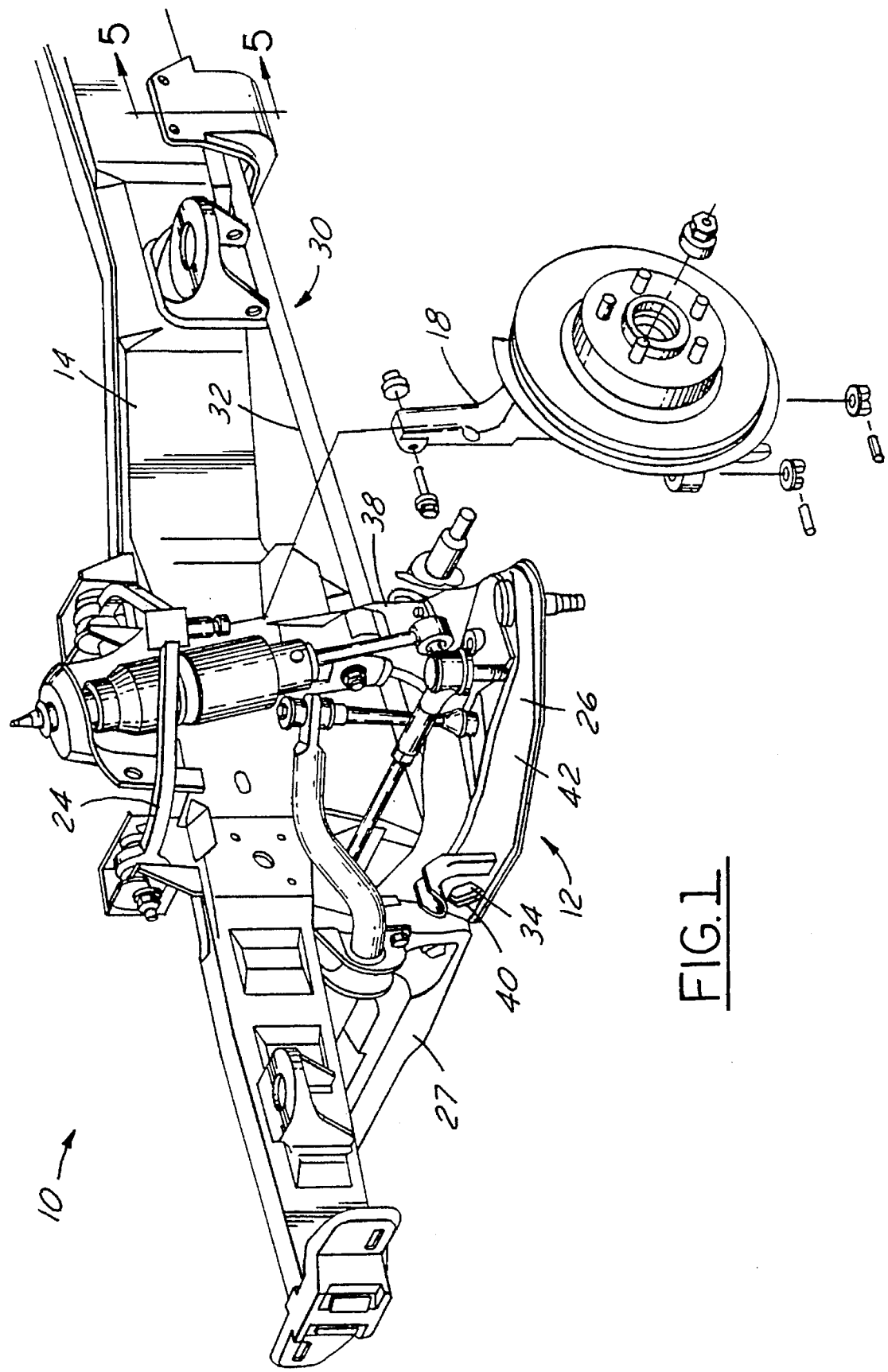
FIG. 1 is a perspective view of a front portion of a motor vehicle chassis provided with an independent torsion spring suspension in accordance with the present invention.

Referring now to FIG. 1, a motor vehicle chassis 10, includes a left independent front suspension 12 of the torsion spring type depending from a left side member 14 of a vehicle frame. It should be noted that a unitized body may be used as an alternative to a body on frame design with equivalent operability and functionality as it relates to the invention described herein. There is also a structural support member 16, extending between the left side member 14 and a right side member (not shown). Since the suspension system for each front wheel is identical, only that for the left side will be described in detail.

The left front wheel (not shown) is rotatably mounted on a wheel support member 18 which is pivotally connected to the outer ends of upper and lower vertically spaced transversely extending control arms 24 and 26 of a V or wishbone shape. The inboard ends of the upper control arm 24 are pivotally connected to the vehicle frame 14. The inboard ends of the lower control arm 26 are also pivotally connected to a front cross member 27 on the vehicle frame 14.

A longitudinally extending torsion spring 30 in the form of a bar or rod extends between the lower suspension arm 26 and the structural support member 16 and is arranged to resiliently restrain articulation of the front wheel suspension 12 in an upward direction relative to the vehicle frame 14. The torsion spring 30 has a straight body portion 32 arranged in axial alignment with the rotational axis of the lower control arm 26. The torsion spring 30 has its forward end formed as a hexagonal flange 34. The flange 34 passes through an aperture (not shown) on a rearward leg 38 of the lower control arm 26 and matingly engages a matching hexagonal aperture 40 on the forward leg 42 of the lower control arm 26.

Figure 5:
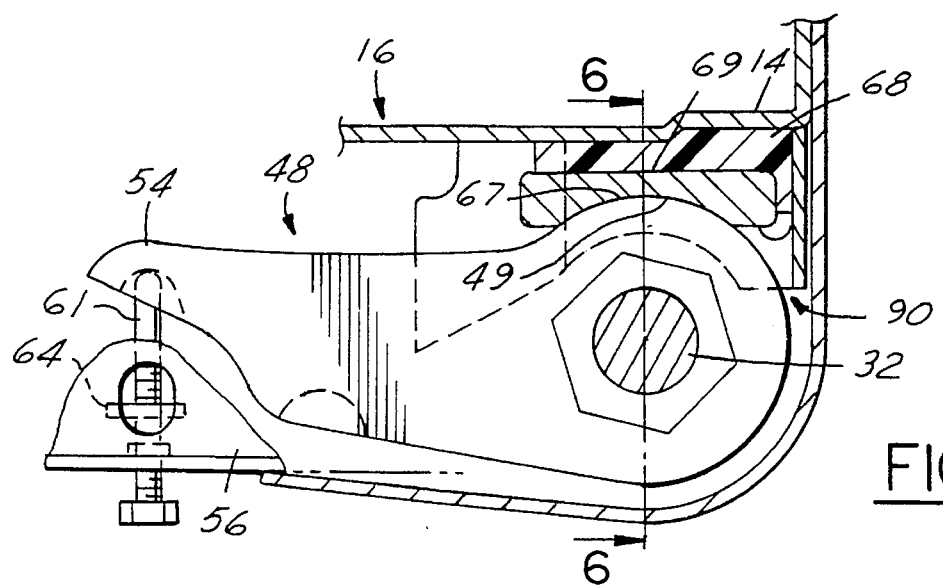
FIG. 5 is a front end elevation and partial sectional view taken from FIG. 1 showing the torsion spring adjuster apparatus according to the present invention.
Figure 6:
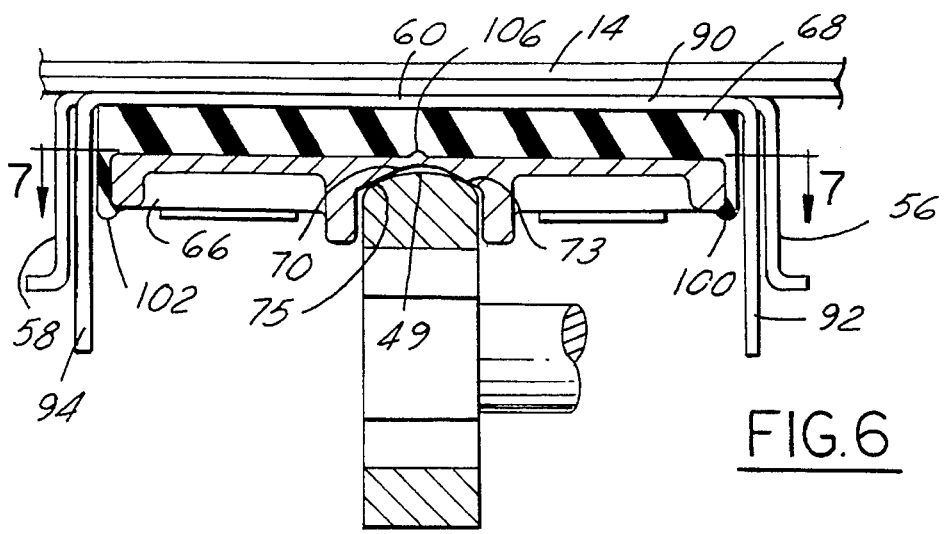
FIG. 6 is a sectional view taken from FIG. 5 of the torsion spring adjuster apparatus according to the present invention.
Figure 7:
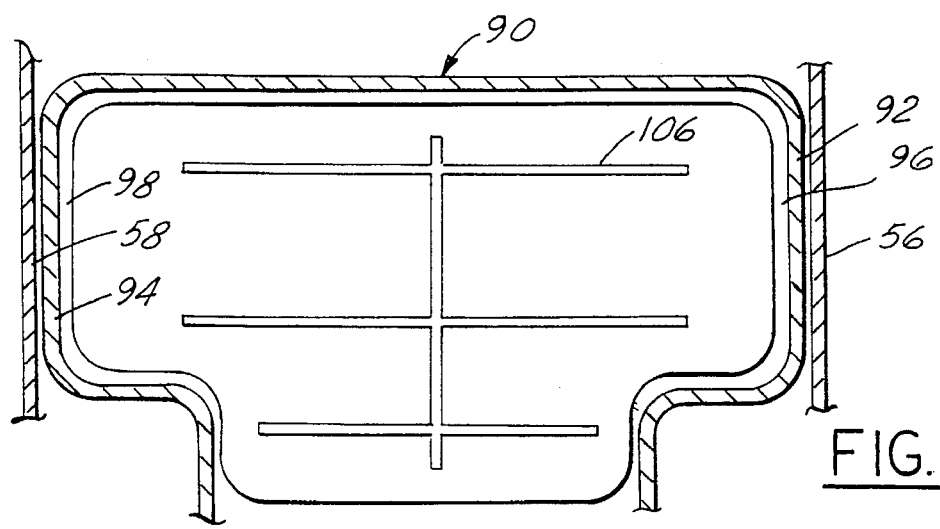
FIG. 7 is a sectional view taken from FIG. 6 of the torsion spring adjuster apparatus according to the present invention.

Referring now to FIGS. 2 and 5, the rearward portion of the torsion spring 30 is formed as a hexagonal flange 44 which matingly engages a non-circular aperture 46 on an adjuster 48. The exterior of the adjuster 48 includes a first contact face 49 on its outer surface 50, which may be semi-circular or semi-spherical. In the preferred embodiment, the first contact face 49 of the outer surface 50 has a first radius of a predetermined magnitude. The adjuster 48 also includes an adjuster arm 52 that extends radially outward and terminates at an arm tip 54.

The arm tip 54 of the adjuster 48 abuts an adjuster bolt 61 threaded in a support nut 64. The support nut 64 is positioned between the front and rear portions 56, 58 of the structural support member 16. The structural support member 16 is in the form of a hat section and comprises front and rear portions 56, 58 depending substantially perpendicularly from a center portion 60. Recesses formed in opposite ends of the support nut 48 engage edges of apertures in the front and rear portions 56, 58 to prevent longitudinal horizontal movement of the nut relative to the structural support member 16. The bolt 61 extends downward from the structural support member 16 exposing the head of the bolt 61 for easy adjustment.

It should be noted that the upper end of the adjusting bolt 61 is rounded to provide a point engagement with the spherical arm tip 54 of the adjuster 48. A minimum of frictional resistance to movement of the adjuster 48 relative to the adjusting bolt 61 is thus present and movement of the adjuster 48 relative to the structural support member 16 is thereby not restricted.

Referring now to FIGS. 3–4, 6 and 7, the adjuster 48 matingly engages an adjuster seat 66, which includes first and second surfaces 67, 69. The adjuster seat 66 includes a second contact face 70 centrally disposed on the first surface 67 for matingly receiving the first contact face 49 therein. Preferably, the engagement of the adjuster 48 and the adjuster seat 66 will be positive, preventing any play therebetween. To ensure this, the second contact face 70 may have a spherical or circular shape having a second radius, somewhat smaller than the first radius. This provides a pair of line interfaces 73, 75, which beneficially improves the longitudinal engagement of the adjuster in the adjuster seat.

An elastomeric pad 68 is sandwiched between the second surface 69 of the adjuster seat 66 and the left side member 14 of the chassis 10. Preferably, the elastomeric pad 68 covers substantially the entire second surface 69, thereby distributing the vertical components of the dynamic reaction loads to the greatest extent possible. The isolation of the vertical reactions may be tuned by varying the durometer of the elastomeric material used as well as thickness of the material provided between the left side member 14 and the adjuster seat 66.

A retainer 90 may be secured to the left side member 14 to improve retention of the elastomeric pad 68 and to provide positive longitudinal placement of the adjuster seat 66. The retainer includes forward and rearward portions extending substantially downward from the left side member 14. The retainer 90 may be constructed to surround substantially the entire elastomeric pad 68 to provide improved durability of the elastomeric pad 68.

The retainer 90 also may provide improved longitudinal isolation for precessional and recessional suspension loading. The forward and rearward portions 92, 94 of the retainer 90 are formed slightly further apart than the longitudinal dimension of the adjuster seat 66, thereby forming forward and rearward channels 96, 98 therebetween. First and second legs 100, 102 of the elastomeric pad 68 extend downward to fill the channels 96, 98, respectively.

The first and second legs 100, 102 also act as an assembly aid during installation. As the adjuster seat 66 and the elastomeric pad 68 are installed in the retainer 90, an interference fit created by slightly oversized first and second legs 100, 102 keep the assembly in place until the adjuster 48 is installed.

The adjuster 48 and adjuster plate 66 can be made from ductile cast iron, or any other suitable material capable of sustaining high compressive and bending loads. Surprisingly, the present invention distributes the normally very high vertical loads sufficiently to allow the elastomeric pad 68 may be made of synthetic rubber compound, which provides two benefits over acceptable alternatives, such as urethane. The synthetic rubber compound may be molded directly onto the adjuster seat 66, thereby reducing the in plant complexity by reducing the number of separate parts. When the elastomeric pad 68 is made from urethane, it must include fingers 104 to retain the elastomeric pad 68 on the adjuster seat 66 during assembly. In addition, to match the retention provided by the bonded synthetic elastomeric pad, the adjuster seat 66 may incorporate a pattern of beads 106 on the second surface. Additionally, the synthetic rubber compounds allow the use of a lower durometer, which can provide improved isolation over the available urethane materials normally used in high stress environments.

During operation, upward movement of the lower suspension arm places the torsion spring under torsional stress, and adjuster 48 applies a vertical reaction force on the adjuster seat 66. Additionally, during precession and recession of the lower control arm 26, the first and second legs 100, 102 of the elastomeric pad 68 allows the adjuster seat 66 and the adjuster 48 together with the torsion spring 30 to move in forward and rearward directions up to a predetermined amount determined by the dimension of the channels 96, 98.

The foregoing description presents one embodiment of the present invention. Details of construction have been shown and described for purposes of illustration rather than limitation. Modifications and alterations of the invention will no doubt occur to those skilled in the art that will come within the scope and spirit of the following claims.

What is claimed:

1. A torsion spring adjustment apparatus for use in a motor vehicle having a torsion spring suspension, said adjustment apparatus comprising:

an adjuster having a non-circular aperture for receiving one end of a torsion bar therein and a first contact face disposed on an outer surface;

an adjuster seat having a first surface and a second surface, said first surface having a second contact face disposed thereon to matingly receive said first contact face of said adjuster; and an elastomeric pad disposed between said second surface of said adjuster seat and a chassis member, said resilient pad being operative to reduce noise generated by operation of the torsion spring suspension.

2. A torsion spring adjustment apparatus according to claim 1, wherein said first contact face is spherical having a first radius.

3. A torsion spring adjustment apparatus according to claim 2, wherein said second contact face is spherical having a second radius smaller than said first radius of said first contact face.

4. A torsion spring adjustment apparatus according to claim 1, wherein said second surface of said adjuster seat includes a raised rib.

5. A torsion spring adjustment apparatus according to claim 1, wherein said elastomeric pad is manufactured from synthetic rubber.

6. A torsion spring adjustment apparatus according to claim 1, wherein said elastomeric pad is molded to said second surface of said adjuster seat.

7. A torsion spring adjustment apparatus according to claim 1, further comprising:

a retainer disposed on said chassis, having a forward portion and a rearward portion longitudinally spaced apart and adapted to receive said adjuster seat therebetween, said retainer being operative to limit fore and aft movement of said adjuster seat.

8. A torsion spring adjustment apparatus according to claim 7, wherein said elastomeric pad further includes first and second legs extending into first and second channels between said adjuster seat and forward and rearward portions of said retainer.

9. A torsion spring adjustment apparatus for use in a motor vehicle having a torsion spring suspension, said adjustment apparatus comprising:

an adjuster having a non-circular aperture for receiving one end of a torsion spring therein and a first contact face disposed on an outer surface;

an adjuster seat having a first surface and a second surface, said first surface having a second contact face disposed thereon to matingly receive said first contact face of said adjuster;

a retainer disposed on said chassis, having a forward portion and a rearward portion longitudinally spaced apart and adapted to receive said adjuster seat therebetween; and an elastomeric pad disposed between said second surface of said adjuster seat and a chassis member, said resilient pad being operative to reduce noise generated by operation of the torsion spring suspension.

10. A torsion spring adjustment apparatus according to claim 9, wherein said first contact face is spherical having a first radius.

11. A torsion spring adjustment apparatus according to claim 10, wherein said second contact face is spherical having a second radius smaller than said first radius of said first contact face.

12. A torsion spring adjustment apparatus according to claim 9, wherein said second surface of said adjuster seat includes a raised rib.

13. A torsion spring adjustment apparatus according to claim 9, wherein said elastomeric pad is manufactured from synthetic rubber.

14. A torsion spring adjustment apparatus according to claim 9, wherein said elastomeric pad is molded to said second surface of said adjuster seat.

15. A torsion spring adjustment apparatus according to claim 9, wherein said elastomeric pad further includes first and second legs extending into first and second channels between said adjuster seat and forward and rearward portions of said retainer.

* * * * *